(12) United States Patent
Oohashi et al.

(10) Patent No.: US 6,921,863 B2
(45) Date of Patent: Jul. 26, 2005

(54) ELECTRIC WIRE FOR ELECTRIC ROTATING MACHINE AND MANUFACTURING METHOD THEREOF, AND METHOD FOR MANUFACTURING ELECTRIC ROTATING MACHINE WINDING

(75) Inventors: Atsushi Oohashi, Tokyo (JP); Kensaku Kuroki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/698,430

(22) Filed: Nov. 3, 2003

(65) Prior Publication Data
US 2004/0221443 A1 Nov. 11, 2004

(30) Foreign Application Priority Data
May 7, 2003 (JP) .................................... P2003-129277

(51) Int. Cl.⁷ ............................................. H02G 15/02
(52) U.S. Cl. ................. 174/74 R; 174/110 R
(58) Field of Search ......................... 174/110 R, 74 R, 174/129 R, 133 R; 310/201, 208

(56) References Cited
U.S. PATENT DOCUMENTS
2001/0035297 A1 * 11/2001 Tamai .................... 174/113 R

FOREIGN PATENT DOCUMENTS
JP 6-153360 * 5/1994
JP 3303854 6/2000

* cited by examiner

*Primary Examiner*—Chau N. Nguyen
(74) *Attorney, Agent, or Firm*—Sughrue Mion, PLLC

(57) ABSTRACT

In case of manufacturing a winding member, it has been necessary to first strip off a coating of an electric wire, and thereafter to perform machining so that an end portion of the electric wire is tapered. Hence, the manufacturing process is complicated and manufacturing cost is high. In the invention, a part of an electric wire 150 that includes a first conductor 112 and a coating 116 is extended to form a second conductor 120. The coating 116 is stripped off by itself due to this extension step. Thereafter, the extended second conductor is cut in the middle thereby forming an electric wire for a winding member 100. This electric wire is formed into a predetermined shape such as U-shape to obtain the winding member 100. As a result, stripping off the coating can be omitted, thus improving working efficiency and enabling reduction in cost.

3 Claims, 10 Drawing Sheets

ELECTRIC WIRE FOR ELECTRIC ROTATING MACHINE AND MANUFACTURING METHOD THEREOF, AND METHOD FOR MANUFACTURING ELECTRIC ROTATING MACHINE WINDING

BACKGROUND OF THE INVENTION

1. Field of the Invention

The present invention relates to an electric wire for use in winding of an electric rotating machine that constitutes an electric rotating machine winding of an AC electric rotating machine such as an electric generator or a motor. The invention also relates to a manufacturing method of an electric wire for an electric rotating machine winding and to a method for manufacturing an electric rotating machine winding.

2. Description of Related Art

In the field of an AC small-sized electric generator (hereinafter referred to as an electric rotating machine) to be mounted on an internal combustion engine installed on, for example, an automobile, ship and agricultural machine, various attempts have been made for the purpose of automating the winding operation around a stator thereof. The reason for those attempts is that it is not easy to wind a long wire around the stator starting from the end due to structure of the long wire.

For example, the Japanese Patent Publication (unexamined) No. 164043/2000 (FIGS. 2, 7, 8, 13) discloses the following method, in the case of windings being wound around a stator of a small-sized electric rotating machine as shown in FIG. 7 thereof. In this known method, coils 23, which have been formed in a U-shape as shown in FIG. 8 of the same, are sequentially fitted to the stator as shown in FIG. 13 of the same. Then end portions of the coil are machined as shown in FIG. 2 of the same, and coil ends 23d, 23f adjacent to each other are sequentially joined.

Further, the Japanese Patent Publication (unexamined) No, 211590/2001 (FIGS. 6–9), discloses the following method. In this method, long strands are folded in a thunder-shape on the same plane all together as shown in FIG. 6 of this publication, and then folded at right angles by means of a jig as shown in FIG. 7. Thus, a strand group of the inside is formed as shown in FIG. 8. Further, a strand group of the outside is formed likewise as shown in FIG. 9, and both of the inside and outside strand groups are integrally formed into a coil. The methods disclosed in the Japanese Patent Publication (unexamined) No. 164043/2000 and the Japanese Patent Publication (unexamined) No. 211590/2001 are different from each other in terms of a manufacturing method of the coil. However, from the viewpoint of connecting the end portions mutually, they are based on the same concept.

In the case of constituting a winding by the method disclosed in the Japanese Patent Publication (unexamined) No. 164043/2000 and the Japanese Patent Publication (unexamined) No. 211590/2001, a coating or film of the winding (generally composed of a resin coating film) is stripped off. Then, a notch is formed at an end portion of a conductor to form a smaller cross-sectional part. This smaller cross sectional part is utilized in order to assure that an enlarged connection portion can be inserted without fail into a narrow portion of an electric rotating machine. A stripping method of a coating 16 includes a method of a mechanical stripping such as machining, blasting or shaving, and a chemical stripping method with the use of chemicals.

In addition, machining of a conductor 112 includes the methods of using a side-cutter, reamer or wire-stripper.

Even if any of the above-mentioned methods or processes is employed, in the case of the technique disclosed in the Japanese Patent Publication (unexamined) No. 1643043/2000, it is essential to conduct separately an operation of forming a notch 114 at an end portion of the conductor 112 after the operation of removing the coating 116 of an electric wire 100 has been implemented. The reason for these operations is that the same tool or machining method cannot be employed since there is any difference in shape or material intended to be machined, and the operations cannot be implemented at the same time.

Thus, it is difficult to achieve the automation by the method disclosed in the Japanese Patent Publication (unexamined) No. 164043/2000. Furthermore, even though the automation is attempted, a plurality of dedicated automatic machines that perform different operations in a dedicated manner respectively have to be used, and the operation has to undergo plural processes. As a result, a problem exits not only in higher cost but also in poor efficiency.

SUMMARY OF THE INVENTION

As mentioned above, the present invention relates to an electric wire for an electric rotating machine winding of an AC electric rotating machine such as electric generator or motor, and a manufacturing method thereof. The invention also relates to a method for manufacturing an electric rotating machine winding. The conventional winding of a stator of a small-sized electric rotating machine has a complicated shape, and therefore it is difficult to automate machining of the winding. In addition, even though the automation is attempted, a plurality of dedicated automatic machines that perform different operations in a dedicated manner respectively have to be used, and the operation has to be conducted by going through plural processes. As a result, there exist problems of higher cost and poor efficiency.

Accordingly, an object of the present invention is to provide a winding electric wire of a stator and a manufacturing method thereof, and a method for manufacturing an electric rotating machine winding, enabling automation with ease at a reasonable cost.

An electric wire for an electric rotating machine winding according to the invention includes: an electric wire (first conductor) which is coated with resin, and of which diameter is A; and a truncated cone-shaped part (second conductor), which is formed at two ends of this coated electric wire, and of which diameter at both end portions is 90% to 50% as large as the mentioned A.

Furthermore, a manufacturing method of the electric wire is as follows. First, a part of an electric wire 150 that includes a first conductor 112 and a coating 116 is extended (made elongated) to form a second conductor 120. The coating 116 is stripped off by itself by the extending process. Thereafter, the second conductor having been extended is cut in the middle to form an electric wire for a winding member 100. This electric wire is formed into a predetermined shape, for example, a U-shape eventually to obtain the winding member 100. Consequently, since the process of stripping off the coating can be omitted, it becomes possible to achieve improvement in working efficiency and reduction in cost.

By employing the mentioned constitution, it comes to be easy to automate machining of the winding. In addition, in the case of automation, it is possible to perform at the same time stripping of the coating at the end portion and forming with the use of one swaging machine. As a result, advantages are obtained such that number of processes is decreased, cost is reduced, and working efficiency is improved.

The foregoing and other objects, features, aspects and advantages of the present invention will become more apparent from the following detailed description of the present invention when taken in conjunction with the accompanying drawings.

DETAILED DESCRIPTION OF THE INVENTION

In a first preferred embodiment, shape of a winding member (it is referred to as a segment-coil as well) of an electric rotating machine according to a present invention is described. In a second embodiment, a method for manufacturing a winding member described in the first embodiment is described. In a third embodiment, a machine for performing this manufacturing method is described.
Embodiment 1

Figure 1:
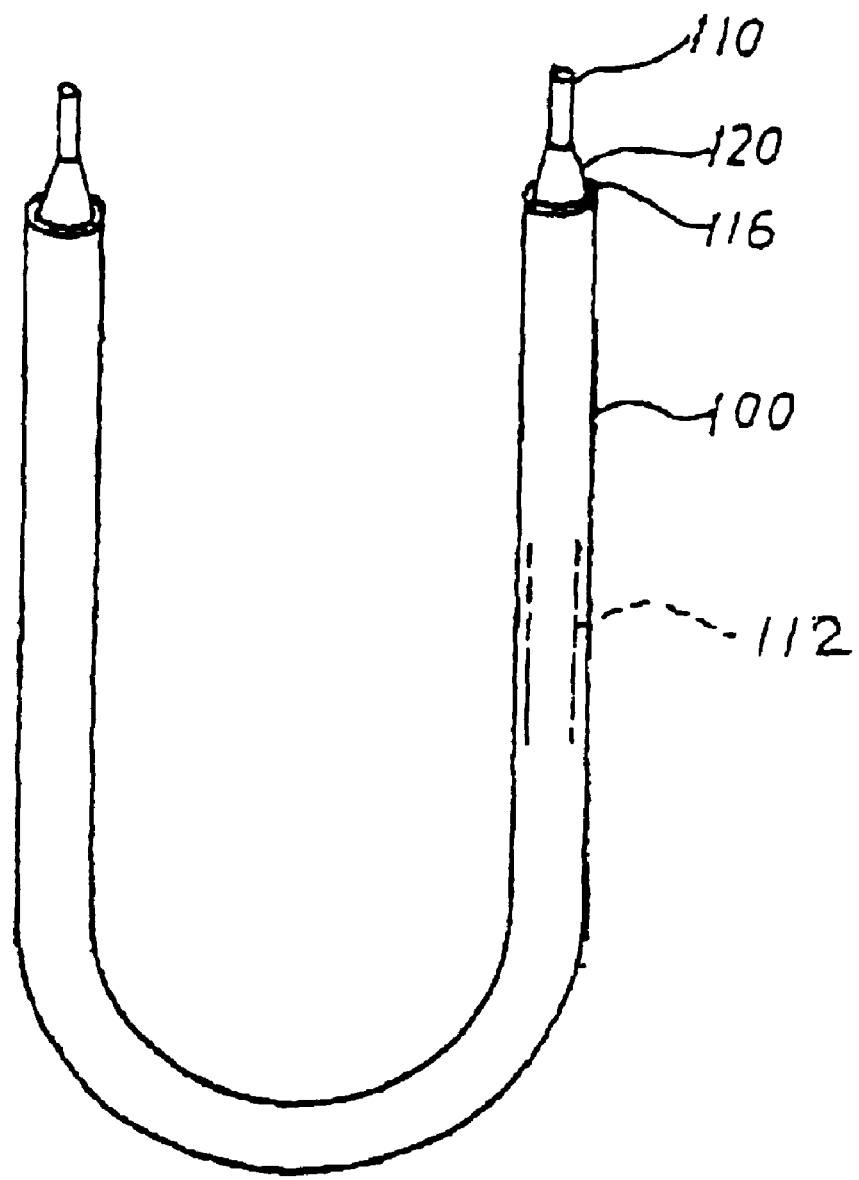
FIG. 1 is a schematic perspective view showing a shape of an electric rotating machine winding according to a first preferred embodiment.
Figure 8:
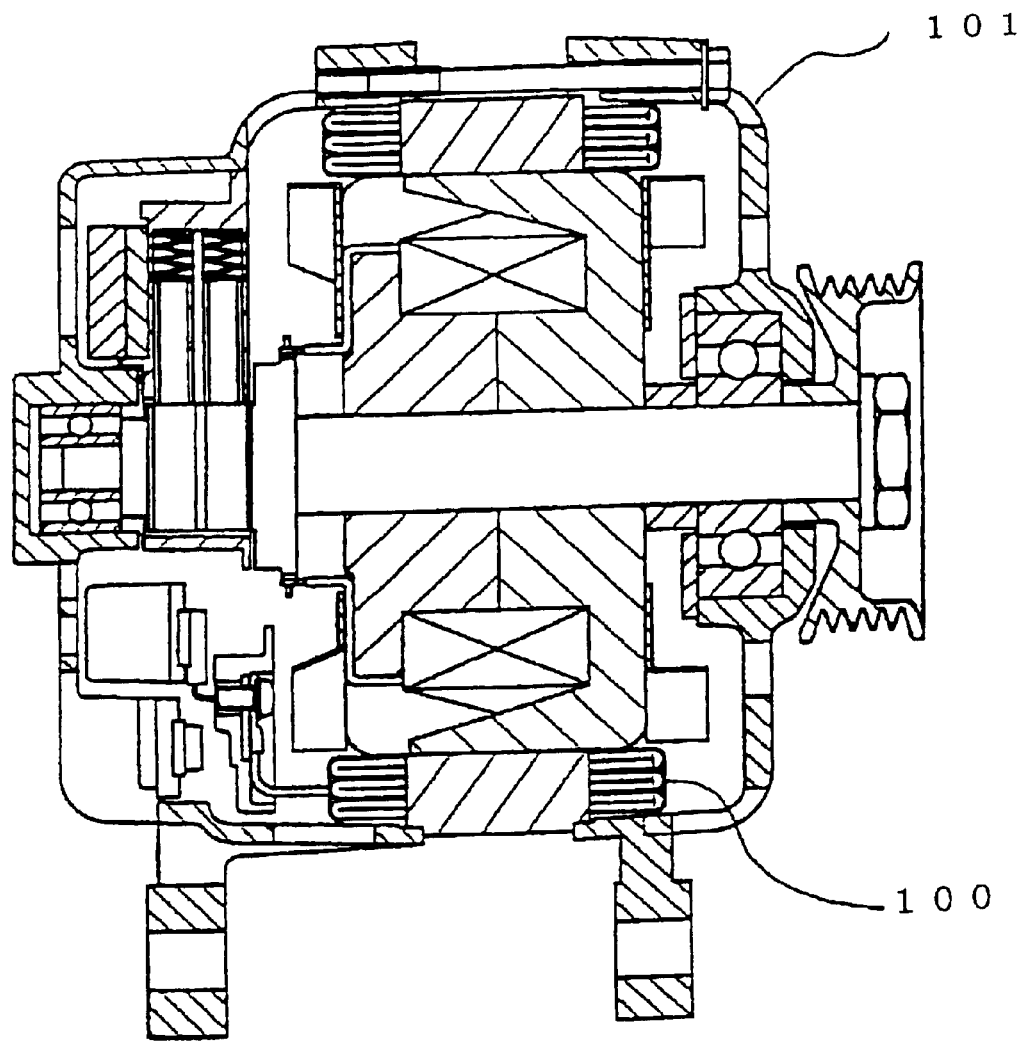
FIG. 8 is a schematic sectional view to explain a coil of an electric rotating machine.

In this first embodiment, a shape and a manufacturing method of a winding member 100 used as a stator coil, for example, of a vehicle AC generator as shown in FIG. 8. are described with reference to FIG. 1.

Figure 2:
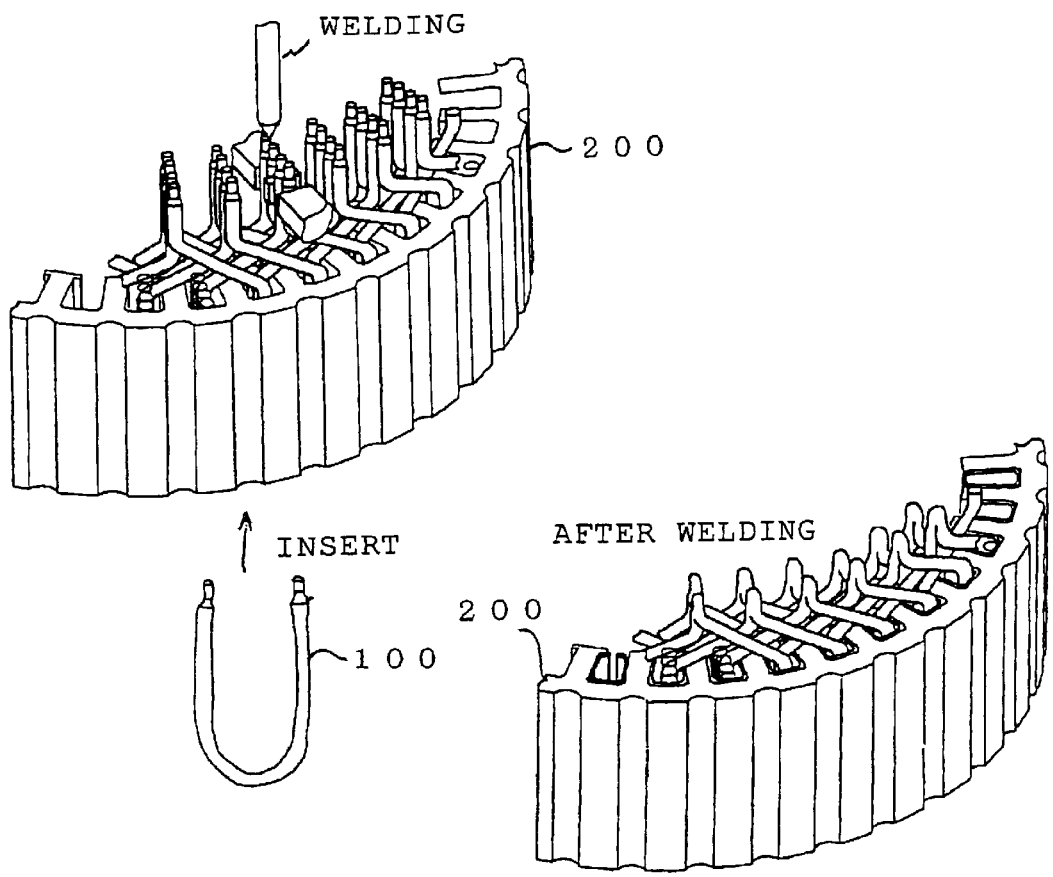
FIG. 2 is a partial view to explain a method for assembling the windings of FIG. 1.

A single winding member 100, which has been machined according to the invention and has been formed in a predetermined shape (for example, U-shaped), is inserted in an axial direction of a stator iron core (core) 200 as shown in FIG. 2 (it is referred to as a winding process). Further, conductors of the adjacent winding members are joined to each other on the side opposite to the insertion (it is referred to as a connection process), thereby forming multiple-phase windings having a plurality of turns. For the better understanding, FIG. 2 shows two drawings, i.e., one drawing immediately after the single winding members have been inserted and another drawing after end portions of the single winding members have been joined by welding to form the windings.

The single winding member 100 is an electric wire provided with a conductor (it is referred to as a first conductor), which is coated with resin, and of which diameter is A. A conductor part 112 is made of copper (it may be aluminum supposing that a suitable joining method is assured). An end portion of the electric wire includes a second conductor of which diameter in cross section is smaller than the diameter A, and a conical part 120 of which diameter varies from an original diameter to the diameter of a smaller-diameter part 110 (diminished gradually). The diameter of the second conductor 110 is 90% to 50% as large as the original diameter A. FIG. 1 shows that a coating 116 is cut apparently at the portion where a diameter of the conical part 120 is the largest. However, as will be described later in a machining method according to the second embodiment, the coating 116 has not to be forcedly cut at a predetermined position. Accordingly, cut position thereof varies within a certain range. This cut position may be anywhere on the conical part 120. For example, the overall conical part 120 may be covered with the coating 116 (sometimes referred to as film).

Length of the second conductor 110 needs to be a length required for joining to the second conductor 110 of the adjacent coil (for example, several times an original thickness of an electric wire). It is desirable, however, that a length of each coil be substantially the same. Although diameter of the second conductor 110 is described to be about 50–90% of an original diameter A of the first conductor as described above, in short, the total thickness of two second conductors 110 has only to be that required for carrying current of the coil (for example, a cross-sectional area of one second conductor is half the whole). Furthermore, it is preferable that diameter of the second conductor is as small as possible.

Length of the conical part 120 needs to be such a length as produces no space between the end portions of the two conductors at the time of getting together and joining them, for example, a length such as the original conductor diameter. However, this length is not essentially required, so that the conical part 120 has only to be a truncated cone-shape of which diameter decreases gradually by degrees from the first conductor to the second conductor. In this case, a truncated cone-shaped part is hereinafter referred to as the second conductor.

To join the conductors together, for example, TIG welding (tungsten inert gas welding) is employed, causing raw materials of the conductor to be fused and joined, thereby enabling to obtain a predetermined welding strength. Besides, insulating properties of a stator winding is assured by coating the joint portion with a resin after having been joined. Such a joining and coating is the art described in the above-mentioned Japanese Patent Publication (unexamined) No. 164043/2000. In the case of joining the conductors to each other, joining process at the end portions of the joint portion of the conductors includes the steps of stripping off the film and then abutting the conductors on each other to generate an arc. To ensure strength of the TIG welding, however, it is essential to strip off the film completely, and bring both end portions into the same length.

Furthermore, it comes to be possible to suppress an electric power of a power supply causing the arc to be generated by providing a smaller-diameter part at the end portion of the conductor.
Embodiment 2

Figure 3:
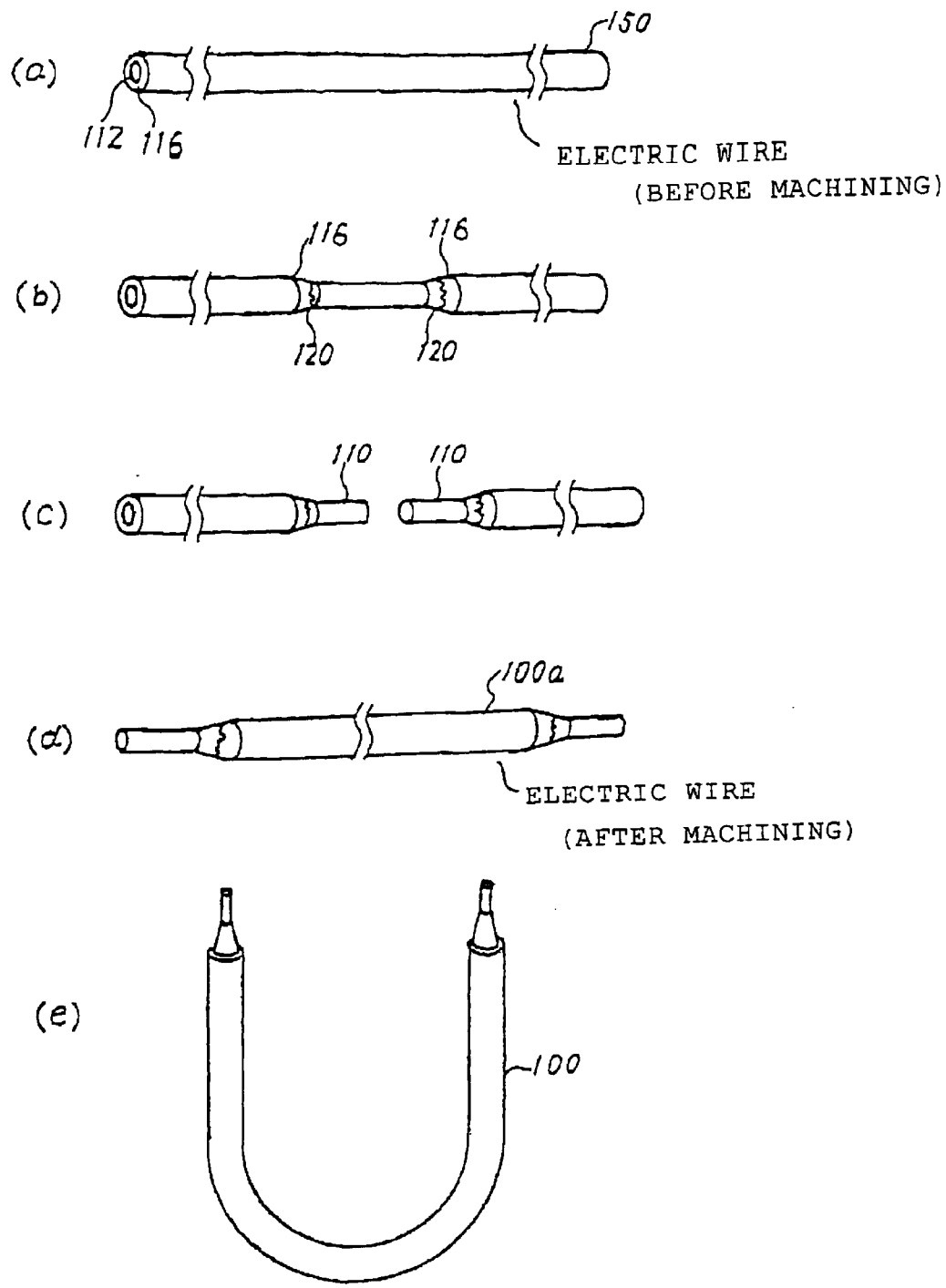
FIGS. 3(a), (b), (c), (d) and (e) are views each to explain a procedure of a manufacturing method according to a second embodiment.

To describe a manufacturing method for manufacturing a single winding member 100 (and winding electric wire) having been described in FIG. 1 of the first embodiment, manufacturing steps are described with reference to FIGS. 3 and 4. FIG. 3(a) shows a long electric wire 150 including the first conductor 112 and the coating 116. FIG. 3(b) shows a shape after having conducted an extension process, in which diameter of the first conductor 112 is made smaller by elongating or extending a part of the electric wire 150 toward both sides. The extension is conducted at intervals of a predetermined length from the end of the electric wire 150 to form the conical part 120 and the second conductor 110. At this time, the coating 116 possesses a lower resistance to the extension than copper or aluminum being the material of the first conductor 112. Accordingly, at the point where extension ratio exceeds a certain range, the coating 116 is stripped off and cut naturally by itself eventually to be cut in the proximity of the conical part 112 indicated by reference numeral 116. In general, the coating having been cut is dropped off and removed in the course of nature. Since the film is to drop off naturally by itself, it is unnecessary to especially design removal of the film. Even if it does not drop off, most of the films will drop off in the subsequent cutting process. FIG. 3(c) shows a state that the second conductor 112 is cut in the middle of the second conductor 112 having been formed by the extension (it is referred to as a cutting process). FIG. 3(d) shows a state before forming the winding member having been obtained as a result of cutting in FIG. 3(c). FIG. 3(e) shows the single winding member 100 having been obtained by forming the winding member in a predetermined shape (U-shaped in the example of this drawing), and the resultant winding member 100 is the same as that shown in FIG. 1 according to the first embodiment.

For better understanding the above-mentioned processes, a flow of the steps is described.

Figure 4:
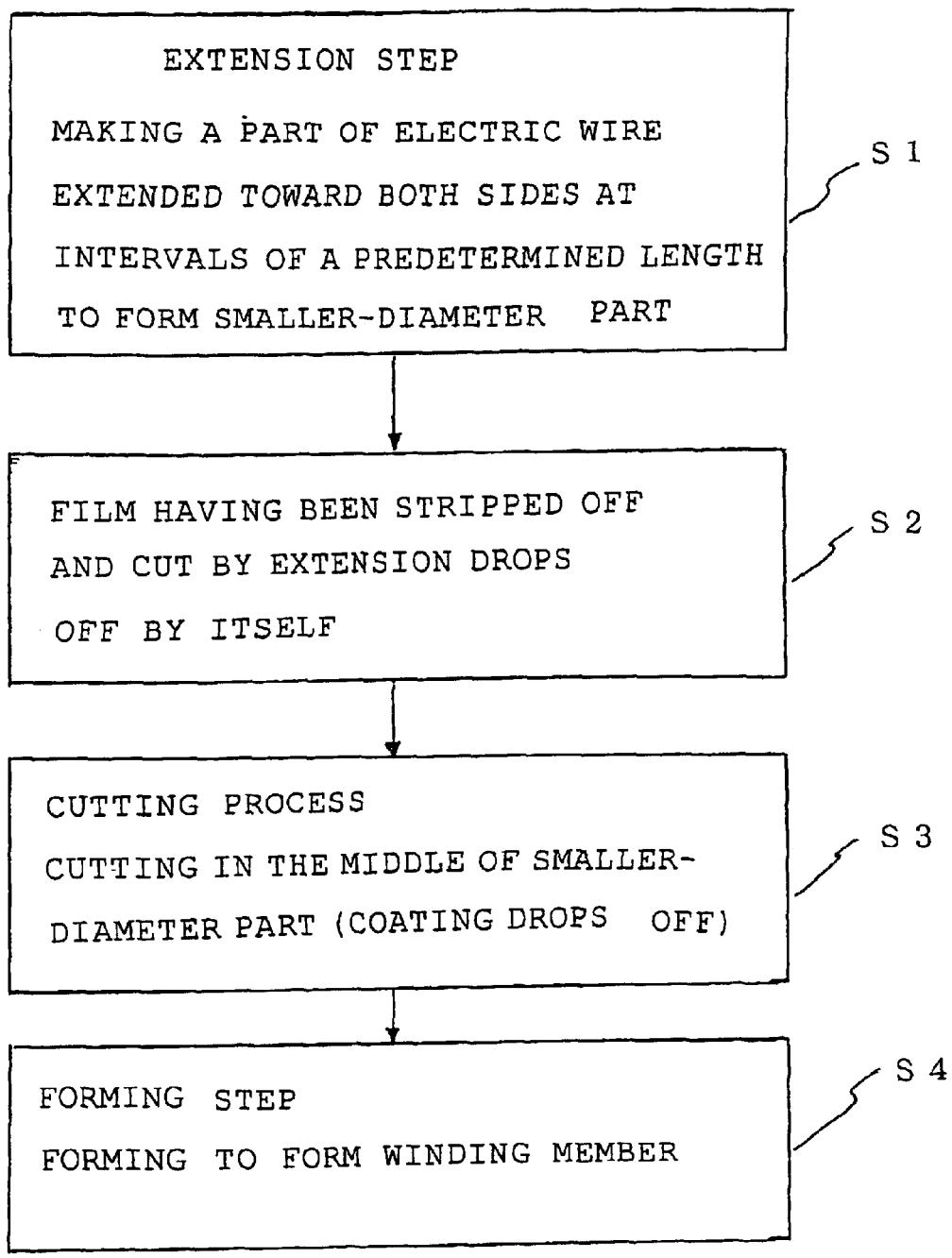
FIG. 4 is a flowchart to explain the procedure.

With reference to FIG. 4, first in the extension process, a part of an electric wire is extended (it does not necessarily imply to be drawn and extended, but the electric wire may be plastically deformed to be extended as will be described in the third embodiment) eventually to form the second conductor (Step S1). At the same time, the coating is stripped and drops off naturally by itself (Step S2). Next, in the cutting process, the electric wire is cut in the middle of the second conductor (Step S3). At this time, the coating, which has not been removed and still left in Step S2, drops off. Subsequently, in the forming process, the electric wire having been cut is formed into a U-shape to be a single winding member.

In the conventional method, a notch has to be essentially formed after having stripped off the film. However, according to the invention, the coating is stripped off in the course of nature just by forming a smaller cross-sectional part (the second conductor) by the method of a plastic deformation of the electric wire. Consequently, advantages are achieved such that it is unnecessary to have the process of especially stripping off the coating, that a machining time is shortened, and that an electric wire is not damaged.

Embodiment 3

In this third embodiment, structure of a rotary swaging machine (it is referred to as a swaging machine) for performing the machining according to the second embodiment is described. As shown in FIG. 5(a), an electric wire 150 is located at the center, and from the center to outward the rotary swaging machine includes a die 20, a wedge 21, a hammer 22, a hammer roller 23, and a swaging roller 24 starting in order. The die 20, the wedge 21, the hammer 22, the hammer roller 23 and the swaging roller 24 form an integral structure, which is referred to as a die body 19. In a traveling direction (direction indicated by the arrow) of the electric wire 150 (starting form the left in front of the drawing), there are disposed a guide 30, and a chuck 32 in the back, which support feeding the electric wire 150.

The die 20 is made of carbide steel, which is held by means of a spring not shown, and acts to come in contact with the electric wire 150 and make it plastically deformed. The wedge 21, which is disposed outside of the die 20, adjusts a diameter to be machined of the die 20 by controlling position of the wedge 21 in a traveling direction of the electric wire 150, thus acting to cause the die 20 to perform the machining of electric wires having different diameters.

Figure 6:
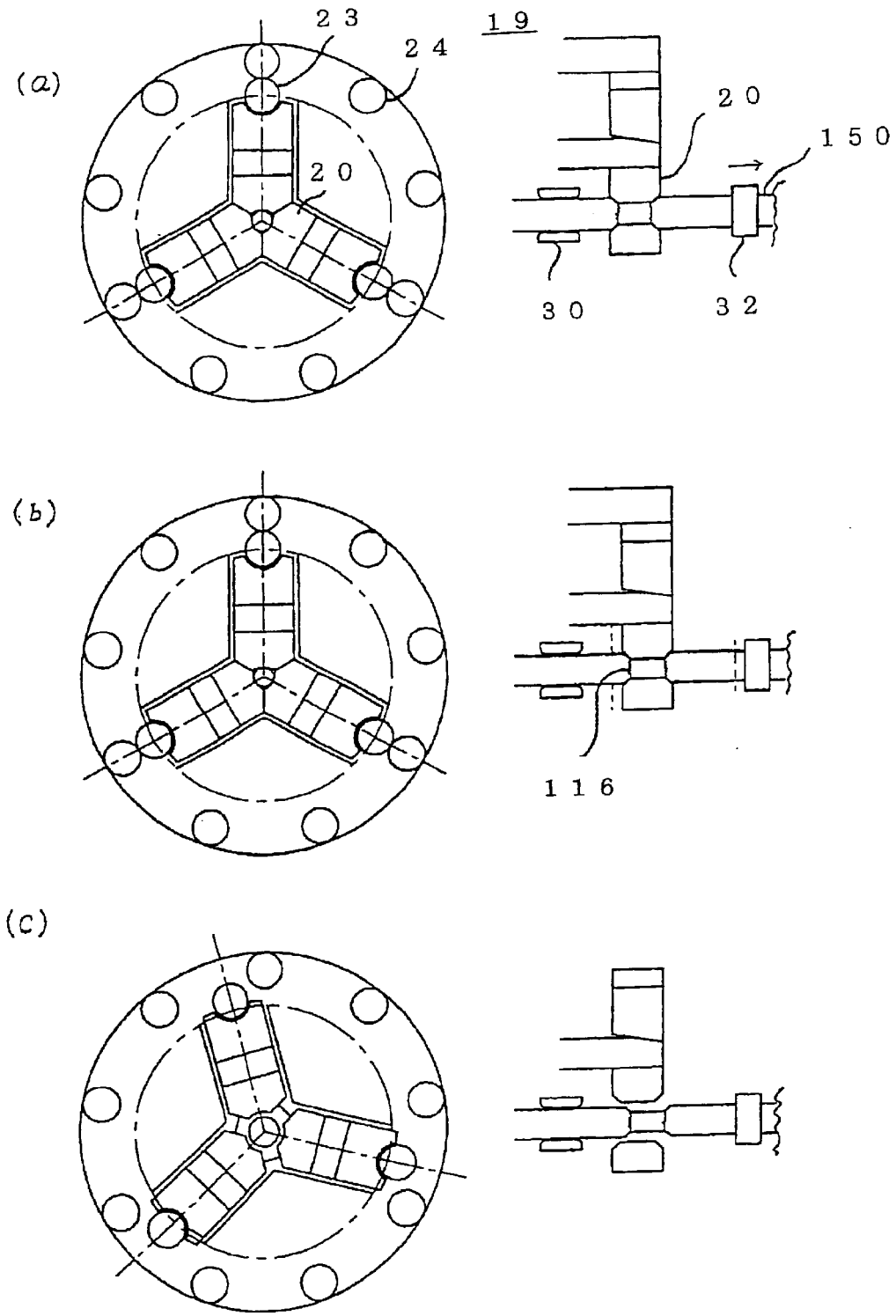
FIGS. 6(a), (b) and (c) are schematic views each to explain operation of the swaging machine of FIG. 5.
Figure 7:
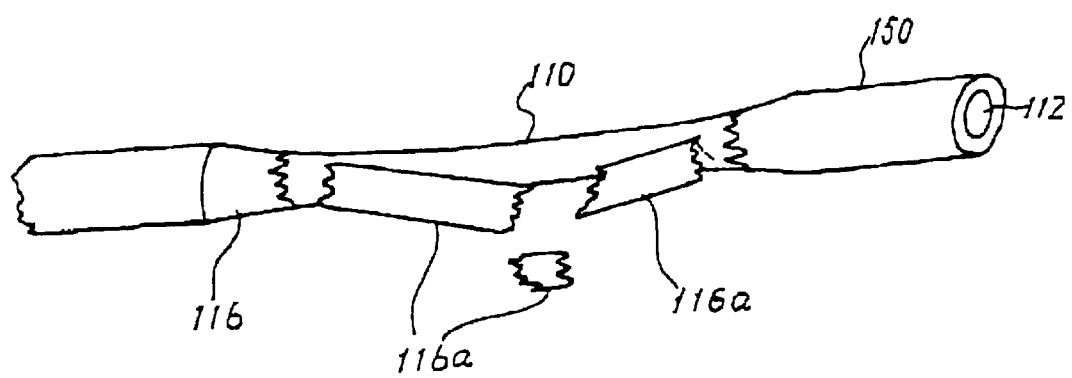
FIG. 7 is a schematic perspective view to explain a state of an electric wire provided by the swaging machine of FIG. 5.

Now, operation of the machine is described. FIGS. 6(a), (b) and (c) are views each to explain steps with the swaging machine. Hereinafter, descriptions as to left and right, and up and down are made in front of the drawings.

Figure 5:
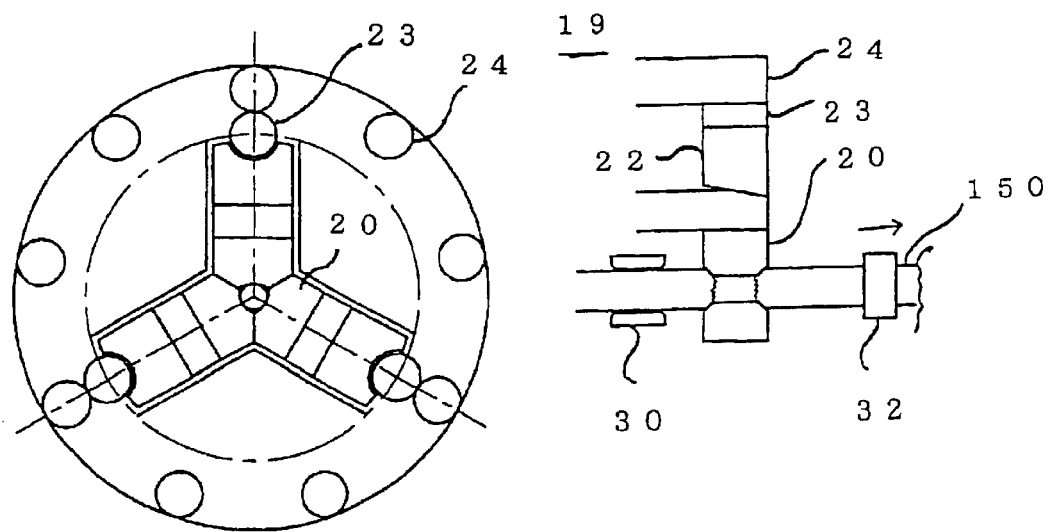
FIG. 5 is a schematic view to explain construction of a swaging machine according to a third embodiment.

First, as shown in FIG. 5/FIG. 6(a), the electric wire 150 is inserted from left side of the drawings. Then the electric wire is held by the chuck 32 to perform the positioning. Thus, nine swaging rollers 24, which are disposed on the side of the outermost diameter, are fixed, and the other parts integrally rotate inside of the swaging rollers 24, whereby the hammer rollers 23 regularly come in contact with the swaging rollers. At this time, the hammers 22 are pressed onto the inner diameter side, thereby pushing the die 20 in three directions, thus a coil is pressed. At this stage, the coil is plastically deformed for a size of the die 20 extending (elongating) toward the side of a traveling direction, thus a smaller diameter portion is formed (this is referred to as an extension process or a plastic deformation process). When the hammer roller 23 is not in contact with the swaging roller 24, the coil 150 and the die 20 do not come in contact with the die 20 by the action of an elastic member, not shown, which is attached to the die 20. Thus, the die 20 (electric wire 150) is fed to the next machining position.

As for the coating 116 of the coil 150, extension of the film 116 is not so large as to follow the extension of the coil for a size of an axial width of the die 20. In addition, the die 20 hammers the film 116, thereby the stripping off the film 116. The former contributes more than the latter to stripping off the film.

As described above, in this third embodiment, a coil is placed on the rotary swaging machine acting as a machine for performing a plastic deformation of a wire rod circular in cross section, and is made smaller in cross section. Thus, an advantage exits in that not only a smaller cross section is achieved, but also the film can be stripped off at the same time.

Furthermore, although not shown, it is also preferable that a cutting tool is located between the die 20 and the chuck 32, and the second conductor is cut when it is fed to the point of this cutting tool.

Embodiment 4

Figure 9:
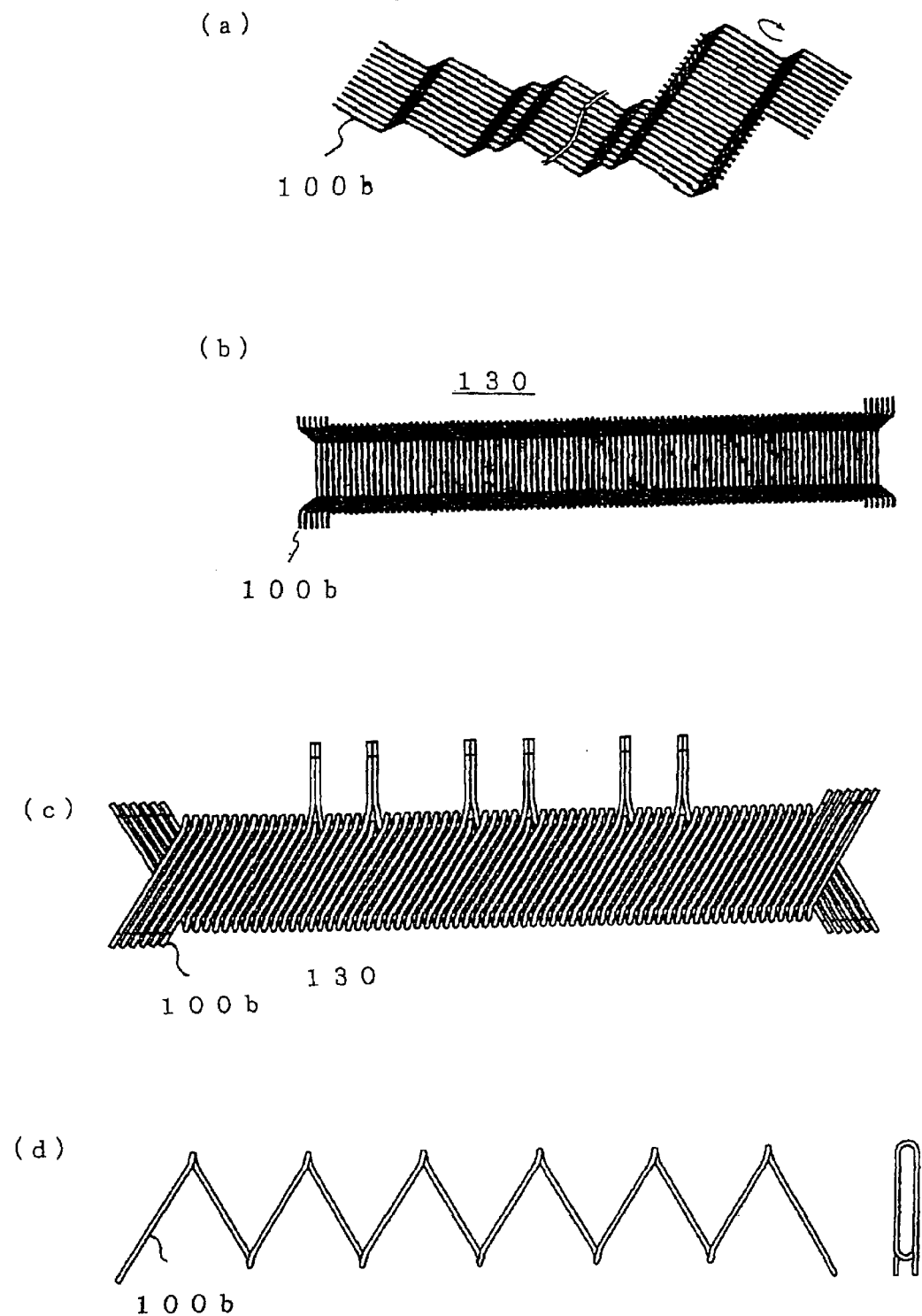
FIGS. 9(a), (b), (c) and (d) are schematic views each showing a long formed coil set according to a fourth embodiment.

In the foregoing first embodiment, a U-shaped winding member is first formed and wound around the stator, and thereafter end portions of the U-shaped winding members are joined to each other to form a stator winding. However, the technique according to the invention can be applied to the case of a coil possessing such a structure as shown in the Japanese Patent Publication (unexamined) No, 211590/2001. That is, this coil is constructed such that first an electric wire, which has been manufactured by the method of machining according to the foregoing first embodiment, is formed in a predetermined shape; and a plurality of long formed coils 100b are aligned as shown in FIG. 9(a) and woven mutually to form a long coil group (it is referred to as a formed coil set 130), and thereafter wound around the stator so as to be set thereon (it is referred to as a mounting process). Specifically, as shown in FIG. 9(a), first a plurality of long formed coils 100b, which have been formed in a predetermined shape, are aligned. Turning attention to coil end portions, the adjacent coil ends are joined to each other by a TIG welding to form a long formed coil set 130 having plural turns (assembling process). This coil set is folded to be a folded long formed coil set 130 as shown in FIG. 9(b). Thereafter, the folded long formed coil set 130 is mounted on slots of the stator, not shown (mounting process). In this fourth embodiment, as compared with the method according to the foregoing first embodiment, number of welding points is sharply decreased whereby the stators can be manufactured at much higher speed. For the better understanding, a detail of FIG. 9(b) is shown in FIG. 9(c). Further, one long formed coil 100b of FIG. 9(c) is shown in FIG. 9(d).

Figure 10:
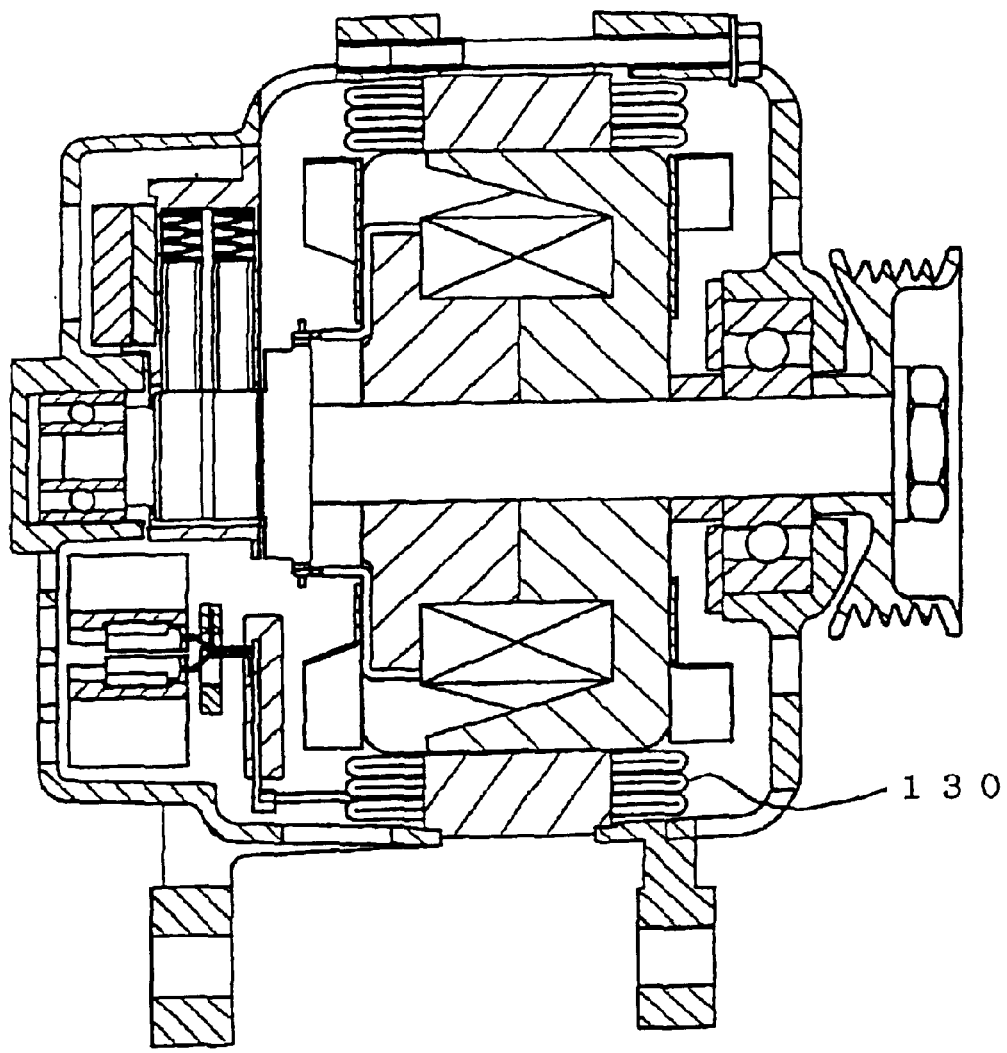
FIG. 10 is a schematic sectional view showing a coil shape of an electric rotating machine manufactured using the coils of FIG. 9

In addition, FIG. 10 shows a structure of an electric rotating machine that is manufactured using this coil just for reference. Although not always clearly shown in the drawing, it is understood from the drawing shape of the end portions of the coil 130 is slightly different from that of the end portions of the coil 100 of the electric rotating machine as shown in FIG. 8.

Besides, in each of the foregoing embodiment, an electric wire to be used is described to be circular in cross section. However, supposing that shape of a die, chuck or guide is transformed into any suitable shape, the invention can also be applied to electric wires that are flat or square in cross section. On the supposition that the coil to be inserted into the slot, not shown, of the stator is formed into a flat shape in cross section, a space factor of the conductor relative to the slot is improved. As a result, it comes to be possible to reduce temperature rise in the stator coil at the time of excitation.

What is claimed is:

1. An electric rotating machine winding comprising:
   a plurality of winding members having a curved shape, each of said winding members comprising:
   a first conductor which is coated with resin, and having a first diameter; and
   a second conductor, including conical portions which are formed at two ends of said first conductor, and end portions formed at said conical portions and having a second diameter which is 90% to 50% as large as said first diameter, wherein said winding members are joined at said end portions of said second conductors to form a continuous wave winding.

2. A method for manufacturing an electric rotating machine winding, the method comprising:
   forming a plurality of winding members, each having a curved shape and comprising a first conductor which is coated with resin and has a first diameter, and a second conductor including conical portions which are formed at two opposite ends of said first conductor, and end portions formed at said conical portions and having a second diameter which is 90% to 50% as large as said first diameter;
   aligning and joining said winding members to form a winding set member, said winding members being joined at said end portions of said second conductors; and
   mounting said winding set member in a stator of said electric rotating machine to form a stator winding;
   said steps being implemented in said sequential order.

3. A manufacturing method of an electric wire for an electric rotating machine winding, the method comprising:
   extending an electric wire including a first conductor which is coated with resin and has a first diameter to form second conductors at intervals of a predetermined length along said first conductor, each of said second conductors including first portions which have a conical shape and are contiguous with said first conductor, and a second portion having a diameter which is 90% to 50% as large as said first diameter, wherein said resin coating is stripped off said second conductors by said extending; and
   cutting said second conductors at a substantially central position of said second in a longitudinal direction of said second conductor, to form a winding member which includes said first conductor and said second conductors at two opposite ends of said first conductor.

* * * * *